United States Patent [19]

Shikichi et al.

[11] Patent Number: 4,785,440
[45] Date of Patent: Nov. 15, 1988

[54] METHOD AND APPARATUS FOR DRIVING AN OPTICAL PICKUP OF AN OPTICAL INFORMATION RECORDING AND REPRODUCING APPARATUS

[75] Inventors: Satoshi Shikichi; Akio Aoki, both of Tokyo; Kazuo Minoura, Yokohama, all of Japan

[73] Assignee: Canon Kabushiki Kaisha, Tokyo, Japan

[21] Appl. No.: 865,442

[22] Filed: May 21, 1986

[30] Foreign Application Priority Data

May 24, 1985 [JP] Japan ................................ 60-110101
Sep. 26, 1985 [JP] Japan ................................ 60-211143

[51] Int. Cl.$^4$ ............................................. G11B 21/10
[52] U.S. Cl. ..................................... 369/44; 369/45; 369/111; 369/32
[58] Field of Search ........................... 369/32, 44, 111

[56] References Cited

U.S. PATENT DOCUMENTS

| | | | |
|---|---|---|---|
| 4,330,880 | 5/1982 | Van Dijk | 369/32 |
| 4,541,083 | 9/1985 | Maeda et al. | 369/44 |
| 4,544,838 | 10/1985 | Musha et al. | 369/44 X |
| 4,575,091 | 2/1983 | Pakin et al. | 369/32 |

*Primary Examiner*—Aristotelis M. Psitos
*Attorney, Agent, or Firm*—Fitzpatrick, Cella, Harper & Scinto

[57] ABSTRACT

Method and apparatus for driving an optical pickup of an optical information recording and reproducing apparatus having the optical pickup movable on an information track of an optical information recording medium having information tracks formed thereon side by side, and an optical pickup drive device for intermittently moving the optical pickup, wherein a distance of movement in one intermittent movement of the optical pickup is smaller than the pitch of the information tracks.

3 Claims, 3 Drawing Sheets

METHOD AND APPARATUS FOR DRIVING AN OPTICAL PICKUP OF AN OPTICAL INFORMATION RECORDING AND REPRODUCING APPARATUS

BACKGROUND OF THE INVENTION

The present invention relates to method apparatus for driving an optical pickup of an optical information recording and reproducing apparatus, and more particularly to a method and apparatus for driving an optical pickup of an optical information recording and reproducing apparatus having the optical pickup movable on an information track of an optical information recording medium having information tracks formed thereon side by side and optical pickup moving means for intermittently moving the optical pickup.

A prior art optical information recording and reproducing method is first explained.

FIG. 1 shows an optical information recording and reproducing apparatus. In FIG. 1, numeral 1 denotes an optical information recording medium which is reciprocated in an X direction during recording and reproducing operations, numeral 2 denotes information tracks which includes first to nth information tracks $21-2n$, numeral 3 denotes an optical pickup, numeral 7 denotes an objective lens, and $\Delta A$ denotes a movable range of the objective lens 7 for tracking. The objective lens 7 is moved by an actuator (which usually comprises a coil and a magnet), not shown. Numeral 4 denotes optical pickup moving means, numeral 5 denotes a ball screw, and numeral 6 denotes a stepping motor. The optical pickup 3 is movable in a Y direction by the optical pickup drive means. A symbol $\theta$ represents an angle between the X direction of the movement of the optical information recording medium 1 and the information tracks 2 due to a setting error (skew angle), $\Delta T$ represents a distance of movement of the objective lens 7 from one information track to an adjacent track (for example, from a track $2k$ to a track $2k+1$), and $\Delta L$ represents a distance of movement in the Y direction of the optical pickup 3 or the objective lens 7 for recording or reproducing information on or from one information track (for example, the track $2k$) when the optical information recording medium 1 is reciprocated in the X direction.

When information is to be recorded or reproduced, the optical information recording medium 1 is normally reciprocated in the X direction and the information is recorded or reproduced on or from the information track 2 by using the objective lens 7. Because of the skew angle $\theta$ due to the setting error, the objective lens 7 is moved in the Y direction while the medium 1 is moved in the X direction in order to record or reproduce one track (for example, the track $2k$) of information, and if the track cannot be traced by the Y direction movement of the objective lens 7, the optical pickup 3 is intermittently moved to prevent the objective lens 7 from being deviated from the information track $2k$.

The movable range $\Delta A$ of the objective lens 7 and the distance $\Delta L$ of movement of the objective lens 7 which is to be moved for recording and reproducing information due to the skew angle usually has the following relationship:

$$\Delta A < \Delta L$$

As a result, the optical pickup 3 must be moved in the Y direction by the optical pickup drive means 4. Assuming that the optical pickup 3 is moved by a distance $\Delta P'$ in one intermittent movement, the objective lens 7 must be moved by a distance $-\Delta P'$ (the same distance as the distance of movement of the optical pickup 3 but in the opposite direction) in order to prevent the objective lens 7 from being deviated from the information track $2k$.

Usually, the distance of movement $\Delta P'$ of the optical pickup 3 and the distance of movement $\Delta T$ of the objective lens 7 when it is moved from one information track to the adjacent track are selected to meet a relationship $$\Delta P' > \Delta T$$

because the larger $\Delta P'$ is, the larger may be the Y direction velocity of the optical pickup 3.

FIG. 2 shows a characteristic curve of the distance of movement of the optical pickup versus time in the optical pickup drive method for the prior art optical information recording and reproducing apparatus. In FIG. 2, $\Delta P''$ represents a secondary oscillation amplitude generated when the optical pickup 3 is moved in the Y direction by the distance $\Delta P'$. If $\Delta P'$ is too large compared to $\Delta T$, the secondary oscillation amplitude $\Delta P''$ is equal to $\Delta T$ or $\Delta P'' > \Delta T$. Accordingly, the distance of movement of the objective lens 7 which is moved in the opposite direction to the optical pickup 3 must be determined by taking $-\Delta P'$ as well as the secondary oscillation amplitude $\Delta P''$ of the optical pickup 3 into consideration. Otherwise, the objective lens 7 is moved to the adjacent information track and the information will not be correctly recorded or reproduced. When $\Delta P''$ is smaller than $\Delta T$, $\Delta P''$ cannot be neglected because the objective lens 7 may be moved beyond the current information track.

Thus, the object lens 7 must be instantly moved in the opposite direction upon the movement of the optical pickup 3. Thus, a large current is usually supplied to the coil of the actuator which drives the objective lens 7 to increase the speed of the objective lens 7.

However, in such a prior art method for driving the optical pickup, the wire diameter of the coil of the actuator is large, the mass of the actuator is large, a large current is required and a large magnet for the actuator is required. As a result, it is not suitable to the high speed drive of the objective lens.

SUMMARY OF THE INVENTION

It is an object of the present invention to provide a method and apparatus for driving an optical pickup of an optical information recording and reproducing apparatus having the optical pickup movable on an information track of an optical information recording medium having information tracks formed thereon side by side and optical pickup drive means for intermittently moving the optical pickup. According to the present invention, this is achieved by means of a system in which the distance of movement of the optical pickup in one intermittent movement is smaller than the pitch of the information tracks.

DETAILED DESCRIPTION OF THE PREFERRED EMBODIMENTS

The preferred embodiments of the present invention will now be described with reference to the drawings.

Figure 3:
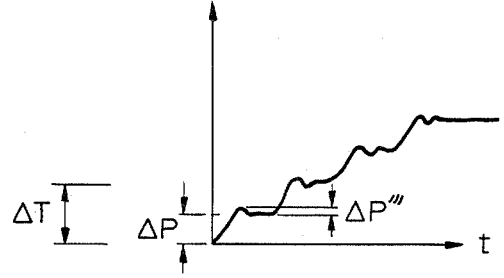
FIG. 3 shows a characteristic curve of a distance of movement of the optical pickup versus time in an embodiment of a method for driving the optical pickup in accordance with the present invention.

FIG. 3 shows a characteristic curve of a distance of movement of an optical pickup versus time in an embodiment of a method for driving the optical pickup of an optical information recording and reproducing apparatus of the present invention.

In FIG. 3, $\Delta T$ represents a distance of movement of the objective lens 7 when it is moved from one information track to an adjacent information track (for example, from a track 2k to a track 2k+ −1), $\Delta P$ represents a Y direction distance of movement of the optical pickup 3 in one incremental movement, and $\Delta P'''$ represents a secondary oscillation amplitude generated when the optical pickup 3 is moved in the Y direction by $\Delta P$. As shown in FIG. 3, $\Delta P$ is selected such that $\Delta P < \Delta T$ and $N \cdot \Delta P \geq \Delta T$, where N is the number of times of intermittent movement of the optical pickup 3. Thus, the Y direction secondary oscillation amplitude $\Delta P'''$ of the optical pickup 3 is much smaller than $\Delta T$ and the recording or reproducing operation of information by the objective lens 7 is not affected by the secondary oscillation amplitude $\Delta P'''$ of the optical pickup 3.

Thus, since the secondary oscillation amplitude $\Delta P'''$ of the optical pickup 3 need not be essentially considered for correct movement of the objective lens 7, a current to be supplied to the actuator may be smaller than that supplied to the actuator used in the prior art method for driving the optical pickup of the optical information recording and reproducing apparatus, and the magnet may also be smaller. As a result, a high speed drive of the optical pickup 3 is attained. Because $\Delta T > \Delta P$, $\Delta T >> \Delta P'''$ and a control error due to the movement of the optical pickup 3 is reduced and $\Delta T$ can be reduced. Thus, a memory capacity of the optical information recording medium can be increased.

In accordance with the method for driving the optical pickup of the optical information recording and reproducing apparatus of the present invention, the high speed drive of the optical pickup is attained, the high access speed of information is attained, the control error due to the movement of the optical pickup is reduced, and the memory capacity of the information recording medium is increased.

An embodiment of a driver for the optical pickup 3 is now explained.

Figure 4:
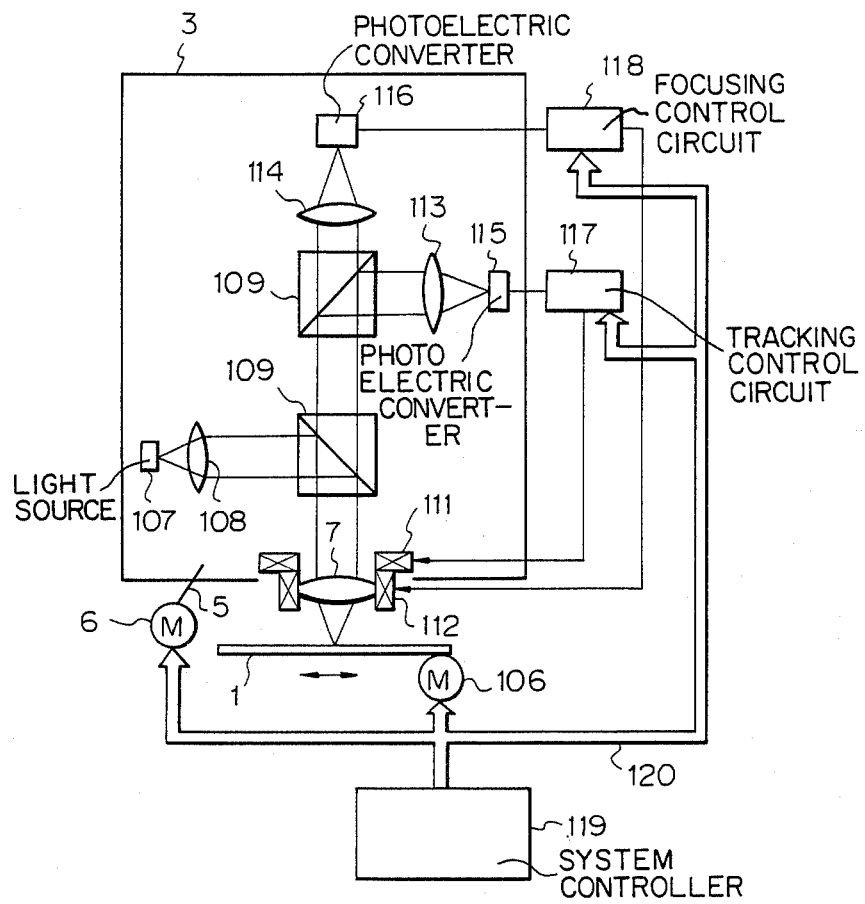
FIG. 4 shows an embodiment of an optical information recording and reproducing apparatus.

FIG. 4 shows a functional diagram of the information recording and reproducing apparatus for the optical card. Numeral 106 denotes a motor for driving the optical information recording medium 1 in a direction of the narrow, numeral 107 denotes a light source such as a semiconductor laser, numeral 108 denotes a collimeter lens, numeral 109 denotes a beam splitter, numeral 7 denotes an objective lens, numeral 111 denotes a tracking coil, numeral 112 denotes a focusing coil, numerals 113 and 114 denote focusing lenses, numerals 115 and 116 denote photo-electric conversion elements, numeral 117 denotes a tracking control circuit, numeral 118 denotes a focusing control circuit, numeral 119 denotes a system controller for controlling the optical information recording and reproducing apparatus and numeral 120 denotes a signal bus including a plurality of lines to and from the system controller 119.

Figure 5:
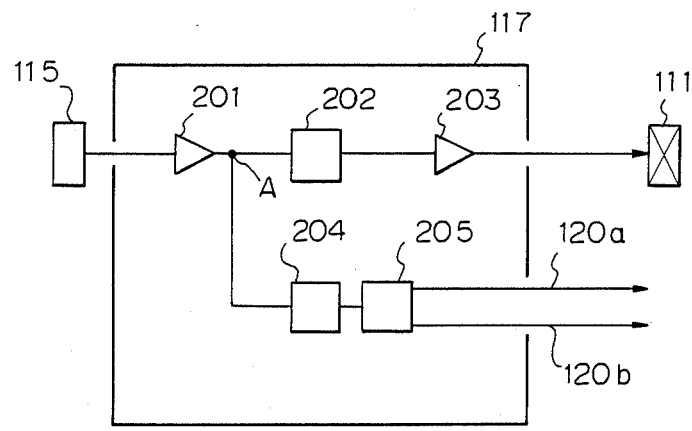
FIG. 5 shows a tracking control circuit for use in the embodiment of FIG. 4.

FIG. 5 shows a tracking control circuit 117 of FIG. 4. Numeral 201 denotes an amplifier for amplifying a signal from the photo-electric converter 115, numeral 202 denotes a phase compensation circuit for stably and precisely carrying out auto-tracking (AT), numeral 203 denotes a drive amplifier for driving a tracking coil 111, numeral 204 denotes a low pass filter, numeral 205 denotes a window comparator, numeral 120a denotes a drive pulse generated to drive the stepping motor 6 and numeral 120b denotes a rotation direction signal for commanding a rotation direction of the stepping motor 6.

Currents are supplied to the tracking coil 111 and the focusing coil 112 by commands from the control circuits 117 and 118 in accordance with the tracking signal and the focusing signal detected by the photoelectric conversion elements 115 and 116, to drive the objective lens 110 to effect the auto-tracking (AT) and the auto-focusing (AF).

When the skew angle $\theta$ is large and the displacement of the objective lens 7 is large, it is necessary to rotate the stepping motor 6 to drive the optical pickup 3 until the distance across which the objective lens 7 is to be moved is reduced, in the opposite direction to that of the movement of the objective lens 7. This is carried out in the following manner.

The auto-tracking error $\Delta l$ is given by $$\Delta l = l/1+G$$

where l (μm) is the displacement of the objective lens 7 and G is a servo gain of the auto-tracking. For example, when l=100 μm and G=1000(=60 dB), $$\Delta l = 100 \text{ μm}/1+1000 \simeq 0.1 \text{ μm}$$

Figure 6:
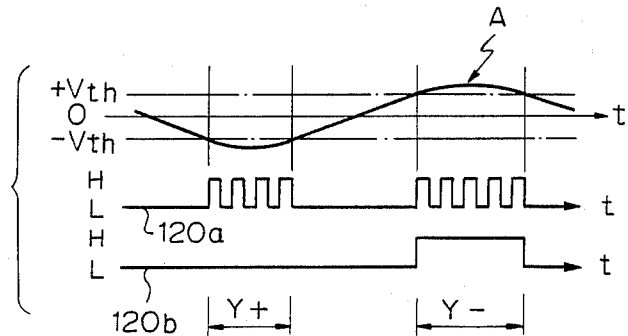
FIG. 6 shows changes in time of a voltage at a point A in FIG. 5, a drive pulse for a stepping motor and a rotation direction signal for the stepping motor.

The displacement l cannot be directly detected. Thus, if the stepping motor 6 is rotated when the displacement of the objective lens 7 is equal to or larger than ±100 μm, the auto-tracking error $\Delta l$ is no less than ±0.1 μm and the displacement l is no less than ±100 μm. The ±0.1 μm is set in the system as a voltage ±Vth at a point A in FIG. 6. Since the signal at the point A includes a high frequency component, the signal is applied to the low pass filter 204 and an output therefrom is applied to the window comparator 205 having a compare level of ±Vth. As a result, the drive pulse 120a for driving the stepping motor 6 and the rotation direction signal 120b for commanding the rotation direction of the stepping motor 6 are generated. Those two signals are supplied to the stepping motor 6 to control the stepping motor 6. Time variations of the voltage signals 120a and 120b at the point A arc shown in FIG. 6. During a period Y+, the voltage at the point A is smaller than −Vth, and the signal 120a is produced as the drive pulse and the signal 120b is produced as "L". During a period Y−, the voltage at the point A is larger than +Vth and the signal 120a is produced as the drive pulse and the signal 120b is produced as "H". Thus, the stepping motor 6 is incremented in the opposite direction to that in the period Y+ so that the optical pickup 3 is incremented in the Y direction. During a period other than the periods Y+ and Y−, the voltage at the point A is smaller than ±Vth and the signal 120a is not produced as the drive pulse and the stepping motor 6 is not rotated. As the optical pickup 3 is incremented, the objective lens 7 is incremented in the opposite direction.

Figure 1:
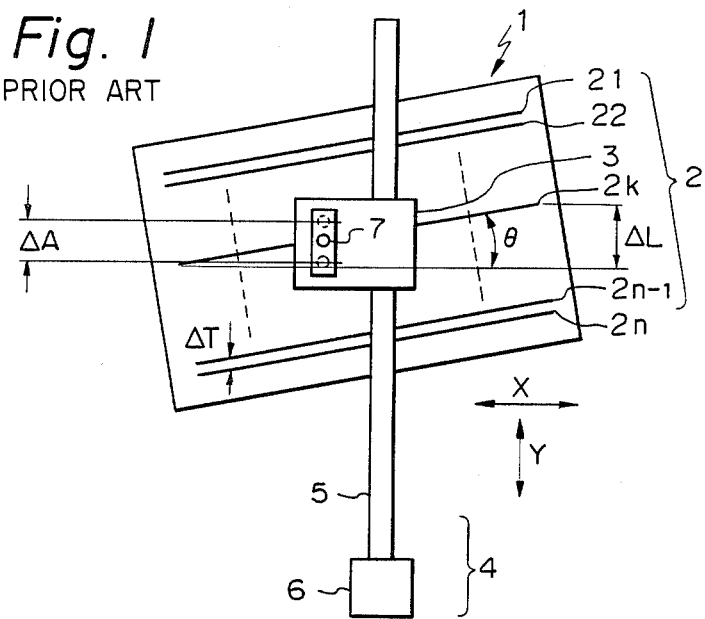
FIG. 1 shows an optical information recording and reproducing apparatus.
Figure 2:
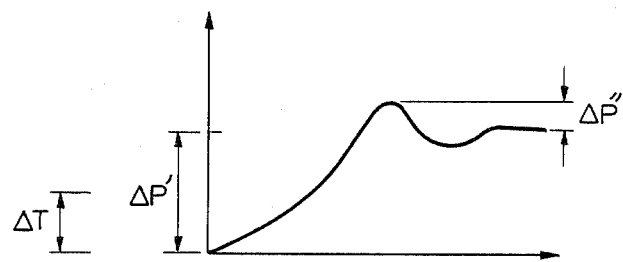
FIG. 2 ahows a characteristic curve of a distance of movement of an optical pickup versus time in a prior art method for driving the optical pickup.

In this manner, the objective lens 7 of FIG. 4 is always kept within the information track of FIG. 1.

What is claimed is:

1. A method for driving an optical pickup of an optical information recording and/or reproducing apparatus in which the optical pickup has an objective lens to be moved along an information track of an optical information recording medium having plural such information tracks formed thereon, said method comprising the steps of:

performing auto-tracking of the objective lens;
    detecting whether the objective lens is displaced a predetermined distance from a reference position in the optical head during the auto-tracking; and
    moving the optical pickup intermittently a plurality of times in the same direction as that of the displacement of the objective lens from the reference position, when the displacement of the predetermined distance is detected in said detecting step, while maintaining the auto-tracking of the objective lens, a distance of movement in each of such intermittent movements of the optical pickup being set to be smaller than a pitch of the information tracks formed on the recording medium.

2. A method according to claim 1, wherein the distance of movement $\Delta P$ in one intermittent movement of said optical pickup is selected to meet the conditions $N\Delta P \geq \Delta T$ and $\Delta P \leq \Delta T$, where N is an integer no smaller than 2, and $\Delta T$ is the pitch of said information tracks.

3. An apparatus for driving an optical pickup of an optical information recording and/or reproducing apparatus in which the optical pickup has an objective lens to be moved along an information track of an optical information recording medium having plural such information tracks formed thereon, said apparatus comprising:

means for performing auto-tracking of the objective lens;
    means for detecting whether the objective lens is displaced a predetermined distance from a reference position in the optical head; and
    means for moving the optical pickup intermittently a plurality of times in the same direction as that of the displacement of the objective lens from the reference position, when the displacement of said predetermined distance is detected by said detecting means, while maintaining the auto-tracking of the objectvie lens, a distance of movement in each of such intermittent movements of the optical pickup being set to be smaller than a pitch of the information tracks formed on the recording medium.

* * * * *

UNITED STATES PATENT AND TRADEMARK OFFICE
CERTIFICATE OF CORRECTION

PATENT NO. : 4,785,440

DATED : November 15, 1988

INVENTOR(S) : Shikichi, et al.

It is certified that error appears in the above-identified patent and that said Letters Patent is hereby corrected as shown below:

[56] REFERENCES CITED
    U.S. Patent Documents, change "4,575,091  2/1983 Pakin et al." to --4,375,091 2/1983 Dakin et al.--

COLUMN 1
    Line 8, change "to method" to --to a method and--;

COLUMN 3
    Line 65, change "narrow" to --arrow--; and
    Line 67, change "eter" to --ater--.

COLUMN 4
    Line 37, change "$\Delta 1 = 1/1+G$" to --$\Delta 1 = 1/1+G$--.

COLUMN 6
    Line 6, change "$N \Delta P \geq \Delta T$" to --$N . \Delta P \geq \Delta T$--.
    Line 27, change "objectvie" to --objective--.

Signed and Sealed this

Thirty-first Day of October, 1989

*Attest:*

DONALD J. QUIGG

*Attesting Officer*    *Commissioner of Patents and Trademarks*